US005372878A

United States Patent [19]

Saito

[11] Patent Number: 5,372,878

[45] Date of Patent: Dec. 13, 1994

[54] SLACKENED OR CREASED FIBROUS SHEET

[75] Inventor: Yoshimitsu Saito, Higashiosaka, Japan

[73] Assignee: Yamasa Momi Kikaku Co., Ltd., Osaka, Japan

[21] Appl. No.: 921,847

[22] Filed: Jun. 23, 1992

[51] Int. Cl.$^5$ .................................................. B32B 5/16

[52] U.S. Cl. .................................... 428/283; 428/284; 428/285; 428/289; 428/290; 428/323; 428/341; 428/406

[58] Field of Search ............... 428/284, 285, 290, 289, 428/283, 323, 406, 341

[56] References Cited

FOREIGN PATENT DOCUMENTS 59-6953 2/1984 Japan .

*Primary Examiner*—James J. Bell

*Attorney, Agent, or Firm*—Fisher & Associates

[57] ABSTRACT

Paper having a relatively high rigidity including Japanese paper and fibrous sheet such as vegetable fibrous sheet and nonwoven fabric are used as base materials for finishing without subjected to any processing while fibrous sheets including some sorts of Japanese paper and spunbonded nonwoven fabric being high in softness and flexibility and bulky, and machine-made paper being lightweight and thin, and moreover having a relatively high rigidity are incapable of or nondurable to physical processing such as beating, bending and crumpling, so that the pretreatment or preliminary processing (primary processing) is applied to these sheets for use as base materials in such a manner that they are resin-treated or have plastic material, elastomer film, woven cloth or one selected from a group of fibrous sheets similar to the above attached thereto so as to convert them into composite sheets. The obtained base materials are subjected to the physical processing, whereby the fibrous texture of the base materials for finishing is slackened, and resin-treated for strengthening, whereby the base materials for finishing are improved in strength and provided with the resilience, water repellency, bulkiness, decorative effect and so forth, so that they can be utilized for daily goods, personal belongings, clothing, interior decoration and so forth when finished. The present invention relates to the raw materials thereof.

28 Claims, No Drawings

SLACKENED OR CREASED FIBROUS SHEET

DESCRIPTION

Technical Field

This invention relates to processing techniques adapted to subject a substrate comprising paper, a vegetable fibrous sheet, a nonwoven fabric or a composite material thereof to physical processing to relax its fibrous structure and then subjecting it to a resin treatment to reinforce it.

Background Art

Processing such as beating, bending, crumpling or the like is generally used for physical processing of a substrate such as paper, a vegetable fibrous sheet, a nonwoven fabric or a composite material thereof to relax its fibrous structure. Subjecting of a substrate such as machine-made paper which has relatively large rigidity to such physical processing causes it to be readily damaged, cracked or broken; therefore, it is generally carried out to apply resin liquid to it or laminate a plastic film or the like onto it to reinforce it.

In general, it is not attained to further subject the substrate or machine-made paper to a resin treatment. If necessary, valley printing with respect to recesses of the substrate, topping with respect to projections of the substrate, coating such as printing or the like is practiced to provide it with aesthetic appearance.

The present invention is distinct from the prior art described above.

More particularly, in the present invention, a substrate of relatively large (increased) rigidity such as machine-made paper is subjected to physical or mechanical processing (hereinafter referred to as "physical processing") such as beating, bending, crumpling or the like to permit a fibrous structure thereof to be relaxed and then subjected to a resin treatment using liquid made of a rigid resin composition (hereinafter referred to as "resin liquid" or "resin solution"), resulting in being reinforced. With respect to a substrate of low rigidity or large bulkiness such as Japanese paper, a nonwoven fabric or the like, the present invention is carried out by treating it with resin liquid to increase rigidity of the substrate. The substrate thus treated is then subjected to the above-described physical processing.

Disclosure of Invention

In the present invention, a substrate includes machine-made paper, Japanese paper and the like. Machine-made paper is decreased in fiber length, requires an adhesive, a filler, an additive and the like in large amounts, and is increased in rigidity, as compared with Japanese paper.

Supposing that Japanese paper and machine-made paper are made into an equal or similar basis weight, the latter is inferior in tear strength and impact resistance to the former.

In order to subject machine-made paper of such properties to physical processing to "loosen" or "unfasten" its fibrous structure or binding, mechanical beating, bending, crumpling or the like is employed.

When machine-made paper has a basis weight as small as 50 g/m$^2$ or less, such mechanical processing causes it to be highly damaged by cracking, breaking or the like, to thereby fail to prepare it into a practicable product.

In order to avoid damage to paper, for example, during crumpling of the paper, it is required to decrease art amplitude of a working machine or a holding equipment, its angle or stroke, or the number of repeating times thereof as compared with a resin treatment of lather, manufactured lather (vinyl lather, synthetic lather, artificial lather or the like) or a fibrous sheet to reduce tension applied thereto during the processing as much as possible. Alternatively, it may be carried out to simply laminate a material like the substrate or a nonwoven fabric thereon to support the substrate for this purpose.

Such situation is true of processing such as beating, bending or the like other than crumpling.

Such treatment of the substrate causes streaks such as strains, wrinkles or the like to be produced on the substrate, resulting in the so-strained or wrinkled portion of the substrate being subject to napping or relaxation of its fibrous structure.

Then, coloring of the substrate, spraying of resin liquid having a colorless or colored material or a particle-like material incorporated therein or free of the material on the substrate, coating of the liquid thereon by means of a gravure coater, a knife, a roll, a reverse roll, a curtain coater or the like, or impregnation or immersing of the substrate in the liquid is carried out to permit the resin liquid to penetrate and be dispersed into the strained or wrinkled portion of the substrate at which the fibrous structure is relaxed.

This results in a section of the thus processed substrate being constructed in such a manner that irrespective of a possible distinct layer of a thickness formed on the substrate, a resin composition of the resin liquid takes root in the relaxed portion of the substrate or fibrous sheet below a coated surface of the substrate while entangling in random lengths, whereas it takes root of a short length in a portion of the substrate other than the relaxed portion.

Further, the processed substrate has a planar structure constructed in such a manner that the strained or streaked portion of the substrate is impregnated with a relatively large amount of resin liquid. Thus, when the resin liquid is colored, the strained or wrinkled portion of the substrate is provided with deep color and the strength of color is gradually dispersed away from the portion to form oozing and/or gradation of color, resulting in natural dispersion or distribution of color and a natural concentration gradient of the resin composition.

Therefore, when a resin composition which is increased in physical properties, elongation or elasticity, or flexibility or softness as compared with the substrate is used for the resin liquid, the substrate is positionally varied in strength or physical properties depending; so that when any external energy is applied to the substrate, the substrate causes the energy to be dispersed to decrease it.

This leads to an increase in relative strength of the substrate.

When an inside on the streaked or strained or wrinkled portion of the substrate increased in content of the resin composition such as, for example, a marbled portion of the substrate formed by crumpling is exposed to tearing force through the strains or wrinkles, the strained or wrinkled portion prevents the force from penetrating into the substrate or leads to dispersion and relaxation of the force.

Also, use of the resin composition which is colored permits a variation in concentration such as a natural concentration gradient or oozing to be produced in a pattern of the resin composition formed on the strained or wrinkled portion of the substrate. Further, incorporation of colored particles, light reflecting beads or infrared reflecting (radiating) ceramic in the resin composition used provides the substrate with decorative properties and/or a desired function.

In addition, a concentration gradient of the resin composition in the strained or wrinkled portion of the substrate causes rigidity and flexibility of the substrate to be positionally varied irrespective of impregnation of the resin liquid in the strained or wrinkled portion of the substrate although the rigidity and flexibility somewhat depend on the impregnation, so that bending and flexing of the substrate may be readily carried out. Thus, the substrate exhibits flexibility, bulkiness and water repellency and provides satisfactory resilience while preventing a pattern like wrinkles or the like from being distinguished.

Thus, the present invention exhibits an advantage like an ever-pressing or permanent-pressing effect attained in the field of clothing.

As will be noted from the foregoing, formation of streaks or a pattern on the substrate is diversified, fined and increased in strength with the number of times of physical processing or a resin treatment.

Characteristics and advantages of the resultant fibrous sheet as a product strengthened by relaxation and streak processing permit industrial applicability of the present invention to be extensively expanded.

BEST MODES FOR CARRYING OUT INVENTION

Best modes for carrying out the present invention will be described hereinafter with reference to examples.

EXAMPLE 1

The present example was practiced using machine-made paper as the substrate for processing.

Beige machine-made paper of 0.07 mm in thickness and 52 g/m$^2$ in basis weight which may be commercially available under a tradename "Shiraoi" from Daishowa Seishi Kabushiki Kaisha was subject to physical processing using an implement disclosed in, for example, Japanese Patent Publication No. 6953/1984 in such a manner that two portions thereof spaced from each other at a predetermined interval or distance in a width direction thereof were grasped by means of a fixture and then the distance between the two portions was reduced to produce looseness in the substrate. Then, the fixture was rocked or pivotally moved to render the substrate flexible and wrinkle it. Subsequently, the fixture was loosened and the substrate was transferred, resulting in another portion of the substrate being grasped by the fixture. Then, the above-described operation was repeated with respect to the substrate. Thus, the whole substrate was successively subject to the physical processing.

Then, resin liquid was coated at small intervals on the so-processed substrate by means of a knife.

The resin liquid used contained a mixture consisting of 100 parts of one-pack type polyurethane (100% modulus: 60 kg/cm$^2$, solid content: 30%) for synthetic lather, 3 parts of red coated pigment paste, 3 parts of calcium carbonate surface-treated with aliphatic acid (average particle diameter: 1$\mu$) and 1 part of silicone resin (solid content: 10%). Then, the mixture is then diluted by 100 parts of mixed solvent of methyl ethyl ketone/toluene (60:40), resulting in the resin liquid being prepared.

The resin liquid was coated in an amount of 70 to 80 g/m$^2$ in the form of a solution.

The coating caused the processed substrate (product) to be colored in deep red at strains and wrinkles of a marbled portion of the substrate and in light red around the strains and wrinkles, resulting in a certain pattern being formed. Also, the substrate was improved in resilience to the feel and exhibited good restoration when it was grasped and then released. When the substrate was grasped, it was bent at strained or wrinkled portions thereof; therefore, it was felt to be considerably flexible as compared with a non-physically processed substrate.

The substrate which was subject to only physical processing was readily teared, however, the substrate which was resin-treated following the physical processing was increased in strength of the strained or wrinkled portion, resulting in the resin-treated substrate being increased in tear strength as compared with the original substrate and provided with water repellency.

EXAMPLE 2

In the present example, a substrate was previously reinforced prior to processing.

A long fiber nonwoven fabric of 80 g/m$^2$ in basis weight and 0.5 mm in thickness (spunbonded nonwoven fabric such as, for example, commercially available under a tradename "Spunbond LAE 4101N" from Toyo Boseki Kabushiki Kaisha) which is soft, bulky and like Japanese paper but does not cause relaxation of the structure and formation of wrinkles by bending was used as a substrate. The substrate was then immersed in resin liquid of 20% in solid resin content and 500 to 1000 cps in viscosity prepared using hard-type acrylic emulsion (for example, 100% modulus: 200 kg/cm$^2$ or more) containing aluminum hydroxide of 1$\mu$ in average particle diameter in an amount of 20% as an extender pigment, to thereby be impregnated with the liquid in a pickup amount of 100%. Then, the substrate was dried and made into a thickness of 0.3 mm, resulting in being provided with rigidity and increased in bonding and strength between fibers.

Then, the substrate which was thus subject to such preliminary processing exhibited strength sufficient to endure the subsequent physical processing and resin treatment, to thereby permit the substrate to be formed with wrinkles or strains by bending and provided with flexibility. Also, this permitted a fibrous structure of a strained or wrinkled portion of the substrate to be relaxed in the subsequent physical processing and resin treatment.

The physical processing and resin treatment were carried out according to the procedure described in Example 1.

The above-described examples are merely illustrative. Now, stock materials and processing which may be available in the present invention will be illustratively described hereinafter.

Materials suitable for use for the substrate in the present invention include paper such as machine-made paper, Japanese paper and the like, sheet-like materials made of vegetable fibers, nonwoven fabrics such as a bonded fabric, a locked fabric, a spunbonded fabric and the like, as well as paper and sheet-like material and nonwoven fabrics subjected to primary processing or a preliminary reinforcing treatment such as those impregnated with resin liquid, coated with the liquid, printed with the liquid on a whole surface thereof or in a desired pattern. The paper and the like may have a laminate material such as a plastic film, a woven fabric or the like laminated on one of surfaces thereof, resulting in a composite material being provided. Alternatively, such a composite material may be prepared by interposing the laminate material between two sheets of papers or the like.

Aqueous resin liquid, solvent type resin liquid or the like may be selectively used for the resin liquid depending on a fibrous material of the substrate. Resins for sizing, impregnation or coating such as natural resin, synthetic resin, elastomer or the like may be used for the resin liquid.

Materials which may be added as additives to a resin composition for the resin liquid in addition to the resin include natural and synthetic dyes, a pigment and an extender pigment. Also, the resin composition may include materials which are capable of improving physical properties of the substrate and providing it with decorative properties. Such materials include powder and particle materials such as ceramic, mica, a shell powder, a cut film, a fibrous powder and glass beads, as well as fibers, an oily agent for lather, a surfactant and the like which serve as a softener or a flexibilizer.

Now, the processing will be described hereinafter. The amount or degree of relaxation of the structure of the fibrous sheet and that of straining or wrinkling of the substrate are varied depending on a type of the substrate, the type of processing, working conditions of a processing machine and the like.

The physical or mechanical processing includes beating, bending, crumpling, a combination thereof, and the like. When the processing is carried out minutely, relaxation and loosening of fibers of the substrate predominantly occur to provide it with flexibility and bulkiness, whereas course processing causes straining and/or wrinkling to mainly occur.

The substrate is reinforces with the resin liquid after the physical processing. This may be carried out by spraying; printing; coating using an air knife, a knife, a roll, a reverse roll, a curtain coater or the like; or a resin treatment such as immersion, impregnation or the like.

In the present invention, a combination of the physical processing and resin treatment is initially carried out as a processing unit. Then, each of the physical processing and resin treatment may be independently repeated out as a processing unit. Alternatively, only one of the physical processing and resin treatment may take place.

Also, printing, embossing or the like for decoration may be suitable practiced.

INDUSTRIAL APPLICABILITY

The relaxed or streaked fibrous sheet of the present invention is processed into various kinds of articles or material beings such as a material for binding or wrapping of stationary including a book, a notebook, a case and the like; a wrapping material for a bouquet, a vanity box or the like; a wrapping material for a furnitures a desk, a bookcase or the like; a material for interior decoration such as a cover for a floor lamp or a desk lamp, a curtain, wall decorating material, or the like; personal belongings such as a bag, a pouch, a footwear, or the like; and a hat, a belt and clothing such as a blouson or the like.

I claim:

1. A slackened or creased fibrous sheet, said sheet comprising:

a substrate having a fibrous structure and selected from the group consisting essentially of paper, vegetable fibrous sheets and nonwoven fabric, said substrate having a basis weight of greater than 50 $g/m^2$, said substrate having been subjected to mechanical processing for loosening said fibrous structure; and a resin material dispersed in said substrate, said resin material dispersed in a non-uniform density through said substrate, said resin material being provided for increasing the relative strength of said substrate.

2. The sheet recited in claim 1 wherein said resin material is concentrated at loosened portions of said fibrous structure.

3. The sheet recited in claim 1, further comprising a laminated layer disposed on either a top or bottom surface of said substrate.

4. The sheet recited in claim 1 wherein said resin material has pigmentation or dyes to provide a color pattern to said substrate.

5. The sheet recited in claim 1 wherein said resin material further comprises particles selected from the group consisting essentially of light reflecting particles, infrared reflecting particles, ceramic, mica, shell powder, glass beads and film particles.

6. The sheet recited in claim 1 wherein said substrate has a flexibility which varies along said substrate, said flexibility being dependant on the impregnation of said resin material.

7. The sheet recited in claim 1 wherein said substrate has a flexibility which varies along said substrate, said flexibility not being dependant on the impregnation of said resin material.

8. The sheet recited in claim 1 wherein said resin material is a dilution of a polyurethane, said polyurethane containing a pigment, calcium carbonate, and silicone.

9. The sheet recited in claim 8 wherein said calcium carbonate has an average particle diameter of $1\mu$.

10. The sheet recited in claim 8 wherein said polyurethane is diluted in methyl ethyl ketone or methyl ethyl toluene.

11. The sheet recited in claim 1 wherein said resin liquid is initially coated on said substrate at a rate of 70 to 80 $g/m^2$.

12. The sheet recited in claim 1 wherein said resin material is an acrylic emulsion, said acrylic emulsion containing a pigment and aluminum hydroxide.

13. The sheet recited in claim 12 wherein said aluminum hydroxide has an average particle diameter of $1\mu$.

14. The sheet recited in claim 12 wherein said acrylic emulsion has a moduls of 200 $Kg/cm^2$ or more.

15. The sheet recited in claim 1 further comprising a laminated layer disposed between two sheets of said substrate.

16. A slackened or creased fibrous sheet, said sheet comprising:

a substrate having a fibrous structure and selected from the group consisting essentially of paper, vegetable fibrous sheets and nonwoven fabric, said substrate having a basis weight of less than or equal to 50 $g/m^2$, said substrate having been subjected to mechanical processing for loosening said fibrous structure;

a laminated layer disposed on either a top or bottom surface of said substrate; and a resin material dispersed in said substrate, said resin material dispersed in a non-uniform density through said substrate, said resin material being provided for increasing the relative strength of said substrate.

17. The sheet recited in claim 16 wherein said resin material is concentrated at loosened portions of said fibrous structure.

18. The sheet recited in claim 16 wherein said resin material has pigmentation or dyes to provide a color pattern to said substrate.

19. The sheet recited in claim 16 wherein said resin material further comprises particles selected from the group consisting essential of light reflecting particles, infrared reflecting particles, ceramic, mica, shell powder, glass beads and film particles.

20. The sheet recited in claim 16 wherein said substrate has a flexibility which varies along said substrate, said flexibility being dependant on the impregnation of said resin material.

21. The sheet recited in claim 16 wherein said substrate has a flexibility which varies along said substrate, said flexibility not being dependant on the impregnation of said resin material.

22. The sheet recited in claim 16 wherein said resin material is a dilution of a polyurethane, said polyurethane containing a pigment, calcium carbonate, and silicone.

23. The sheet recited in claim 22 wherein said calcium carbonate has an average particle diameter of $1\mu$.

24. The sheet recited in claim 22 wherein said polyurethane is diluted in methyl ethyl ketone or methyl ethyl toluene.

25. The sheet recited in claim 16 wherein said resin liquid is initially coated on said substrate at a rate of 70 to 80 $g/m^2$.

26. The sheet recited in claim 16 wherein said resin material is an acrylic emulsion, said acrylic emulsion containing a pigment and aluminum hydroxide.

27. The sheet recited in claim 26 wherein said aluminum hydroxide has an average particle diameter of $1\mu$.

28. The sheet recited in claim 26 wherein said acrylic emulsion has a modulus of 200 $Kg/cm^2$ or more.

* * * * *